United States Patent [19]

Abo et al.

[11] 4,378,673
[45] Apr. 5, 1983

[54] FUEL CONTROL SYSTEM FOR GAS TURBINE ENGINE

[75] Inventors: Toshimi Abo; Hidetoshi Kanegae, both of Yokohama, Japan

[73] Assignee: Nissan Motor Co., Ltd., Yokohama, Japan

[21] Appl. No.: 156,776

[22] Filed: Jun. 4, 1980

[30] Foreign Application Priority Data

Jun. 4, 1979 [JP] Japan .................................. 54-69553

[51] Int. Cl.³ .............................................. F02C 9/04
[52] U.S. Cl. ............................ 60/39.141; 60/39.161; 60/39.281
[58] Field of Search ................... 60/39.16 R, 39.14 R, 60/39.28 R

[56] References Cited

U.S. PATENT DOCUMENTS

| 3,520,133 | 7/1970 | Loft et al. | 60/39.14 R |
|---|---|---|---|
| 3,533,236 | 10/1970 | Cottington | 60/39.28 R |
| 3,686,860 | 8/1972 | White | 60/39.16 R |
| 3,749,048 | 7/1973 | Jones et al. | 60/39.16 R |
| 3,938,320 | 2/1976 | Nelson | 60/39.14 R |
| 4,040,250 | 8/1977 | Saunders et al. | 60/39.16 R |
| 4,044,554 | 8/1977 | West | 60/39.28 R |
| 4,283,410 | 8/1981 | Abo | 60/39.28 R |

Primary Examiner—Robert E. Garrett
Assistant Examiner—Jeffrey A. Simenauer
Attorney, Agent, or Firm—Lowe, King, Price & Becker

[57] ABSTRACT

A fuel control system for a dual-shaft gas turbine engine having a gasifier turbine and a power turbine comprises a device for supplying fuel to a combustor of the engine by an amount necessary for engine ignition during engine starting. Under normal operating conditions, fuel is supplied to the combustor by a closed loop controller. An accelerating device increases the fuel supply to the combustor as time progresses from a first time when engine ignition takes place to a second time when the closed loop control of fuel supply takes place, thereby shortening the time period required for the engine to reach normal operation.

14 Claims, 3 Drawing Figures

FUEL CONTROL SYSTEM FOR GAS TURBINE ENGINE

BACKGROUND OF THE INVENTION

This invention relates in general to an improvement in a dual-shaft gas turbine engine having two independently rotatable shafts on which a gasifier turbine and a power turbine are respectively mounted, and more particularly to a device for controlling fuel supply at engine starting of the dual-shaft gas turbine engine.

In a dual-shaft gas turbine engine, fuel supply under normal engine operating conditions is usually controlled in a so-called proportional or proportional-integral closed loop, i.e., feedback, control mode so that the rotational speed of a power turbine agrees with a target level. With such a fuel supply control mode, a suitable fuel supply cannot be expected during engine starting. The power turbine rotational speed deviates from the normal speed target level extensively during engine starting. Therefore a large amount of feedback control is required during starting; this large amount of feedback control results in excessive fuel consumption.

As appreciated, it is desirable to obtain an optimum air-fuel ratio during engine starting, and accordingly an optimum amount of fuel for ignition is supplied in dependence on an amount of air corresponding to the rotational speed of a compressor turbine which is driven by a starter motor. Therefore, during engine starting, it is not suitable to provide the normal speed closed loop mode control of the rotational speed of the power turbine so the turbine speed agrees with the normal speed target level.

In this regard, control of power turbine rotational speed during engine starting has been previously provided from experience by determining optimum fuel amount for engine starting. The thus determined fuel amount is supplied to the engine until the power turbine rotational speed reaches a predetermined level after engine ignition. Then the closed loop control is initiated.

Because the optimum fuel supply for engine starting is maintained until the power turbine rotational speed reaches the predetermined level, there is a tendency for a prolonged starting time period. Therefore, such a control mode is not particularly suitable for a drive power source used for driving an emergency electric power generating device which requires a shorter engine starting time period.

BRIEF SUMMARY OF THE INVENTION

In accordance with the present invention, an improvement is made in a fuel control system for a dual-shaft gas turbine engine having a gasifier turbine and power turbine which respectively are mounted on two independently rotatable shafts. The control system includes means for supplying an engine combustor an amount of fuel necessary for engine ignition during engine starting. During normal operation fuel is supplied to the combustor in a closed loop control mode to reduce the deviation of the power turbine rotational speed from a predetermined level for the power turbine rotational speed. The improved fuel control system includes means for detecting when engine ignition takes place, and accelerating means for increasing the amount of fuel supplied to the combustor as time progresses from a first time period when engine ignition takes place to a second time period when the closed loop control of fuel supply takes place.

An object of the present invention is to provide an improved fuel control system for a dual-shaft gas turbine engine, wherein the engine can be effectively operated to overcome the drawbacks encountered in conventional fuel control systems for the same engines.

Another object of the present invention is to provide an improved fuel control system for a dual-shaft gas turbine engine wherein the rotational speed of a gasifier turbine is smoothly and stably accelerated during an initial period of engine starting.

A still further object of the present invention is to provide an improved fuel control system for a dual-shaft gas turbine engine wherein the amount of fuel supplied to a combustor is gradually increased after engine ignition takes place.

BRIEF DESCRIPTION OF THE DRAWINGS

The features and advantages of the fuel control system according to the present invention will be more clearly appreciated from the following description taken in conjunction with the accompanying drawings in which like reference nuemrals and characters designate corresponding elements, and in which.

DETAILED DESCRIPTION OF THE PREFERRED EMBODIMENT

Figure 1:
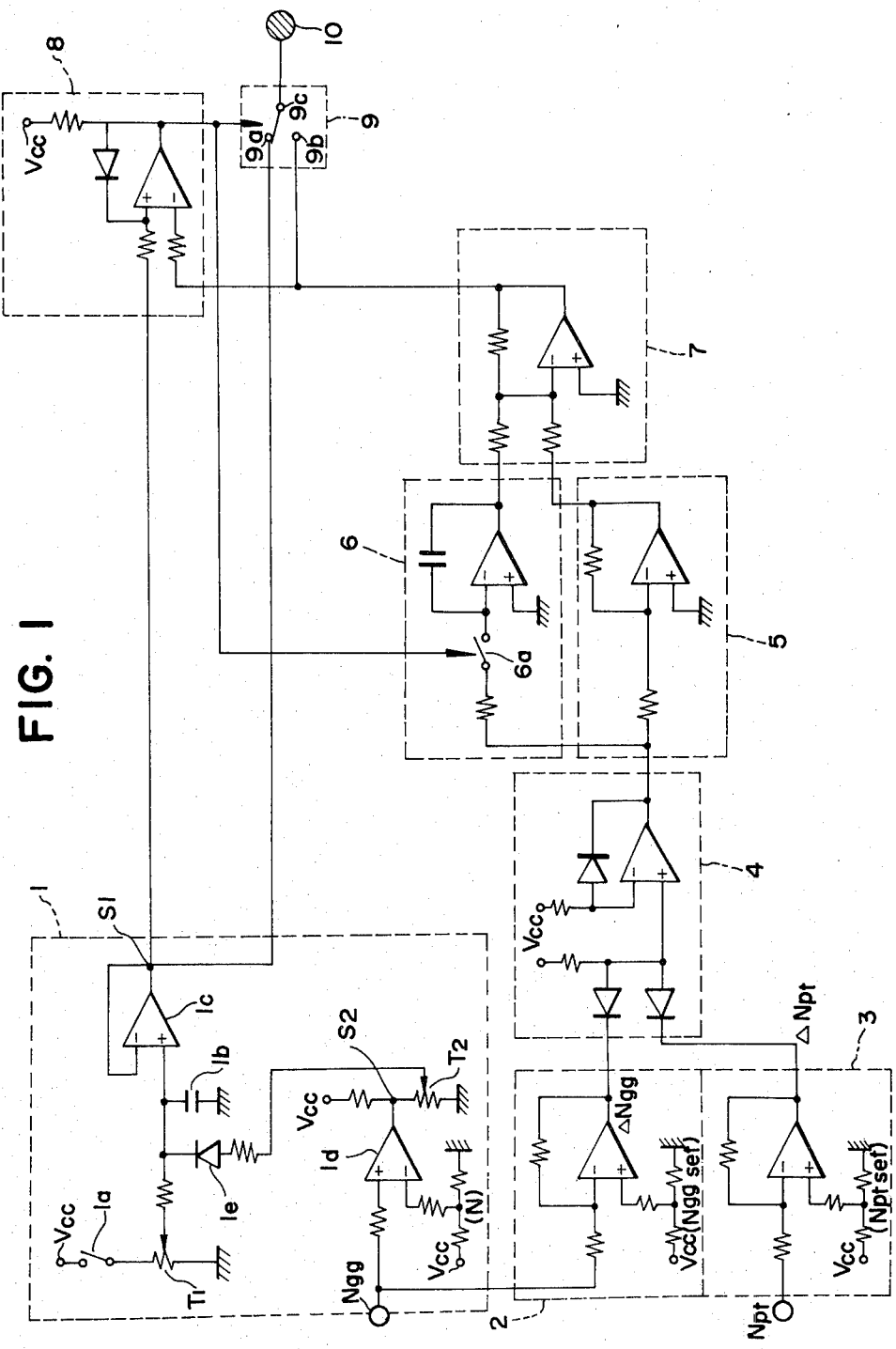
FIG. 1 is a circuit diagram of a fuel control system of an embodiment of a fuel control system according to the present invention.

Referring now to FIG. 1 of the drawings, there is shown an embodiment of a circuit diagram of a fuel control system of a dual-shaft gas turbine engine, in accordance with the present invention. The dual-shaft gas turbine engine is, as usual, provided with two independently rotatable shafts, not shown. A gasifier turbine and a compressor turbine are mounted on one of the rotatable shafts, and a power turbine is mounted on another shaft, not shown.

Set point circuit 1 selectively supplies first and second signals, via switching circuit 9, to fuel control valve 10. The first signal supplied by circuit 1 to valve 10 controls an optimum amount of fuel for a previously set engine operation; the first signal is supplied to valve 10 from the time of engine starting to a judged engine ignition time. The second signal gradually increases the amount of fuel supplied by valve 10 to obtain smooth and stable engine acceleration characteristics as described infra. The fuel supply control valve 10 is arranged to controllably supply fuel to a combustor, not shown, for the gas turbine engine.

Gasifier turbine rotational speed deviation detecting circuit 2 computes the deviation $\Delta Ngg$ of a signal representative of the gasifier turbine rotational speed, $Ngg$, from a signal representative of rated gasifier turbine rotational speed $Nggset$. A power turbine rotational speed deviation detecting circuit 3 computes the deviation $\Delta Npt$ of a signal representative of power turbine rotational speed $Npt$ from a power turbine target rotational speed $Nptset$. A selecting circuit 4 selects the smaller value of the deviations $\Delta Ngg$ and $\Delta Npt$ derived from the detecting circuits 2 and 3 to produce an output.

A proportional circuit 5 and an integrating circuit 6 respectively derive signals having values proportional to the value and of the integral of the output of the selecting circuit 4. An adder 7 sums the values derived from proportional circuit 5 and integrating circuit 6. Thereby, adder 7 derives a signal representing the value and the integral of the smallest rotational speed deviation $\Delta Ngg$ or $\Delta Npt$. The output signal of adder 7 is a closed loop control signal which is supplied, during normal operation, through the switching circuit 9 to control the amount of fuel supplied by valve 10 to the gas turbine combuster.

Detecting circuits 2 and 3, selecting circuit 4, proportional circuit 5, integrating circuit 6, and adder 7 constitute a closed loop control system which normally provides a closed loop controller for the rotational speed Npt of the power turbine. The closed loop controller controls the amount of fuel supplied by valve 10 to the combuster in response to the deviation $\Delta Npt$ so that the actual rotational speed (Npt) of the power turbine becomes equal to the target rotational speed (Nptset) of the power turbine. However, if the gasifier turbine rotational speed Ngg increases considerably so there is a decrease in the deviation $\Delta Ngg$ of the rotational speed Ngg from the rated rotational speed (Nggset) so that the deviation $\Delta Ngg$ becomes smaller than the power turbine speed deviation $\Delta Npt$, the amount of fuel supplied by valve 10 is controlled in response to the deviation $\Delta Ngg$ instead of by the deviation $\Delta Npt$. Thereby, the rotational speed of the gasifier turbine is controlled in the closed loop control mode, causing the gasifier turbine speed to be controlled by the rated rotational speed Nggset. This prevents the rotational speed Ngg from becoming much higher than the rated rotational speed Nggset, preventing an accident that could occur if the rotational speed Ngg rises excessibly.

Comparator circuit 8 determines when the closed loop control should start in response to the relative amplitudes of the outputs of adder 7 and set point circuit 1. When circuit 8 detects that the output of circuit 7 is greater than or equal to the output of circuit 1 the system is in a start mode, at which time circuit 8 activates switch 9 so contacts 9a and 9c are closed and the output of circuit 1 is applied to valve 10. During the start mode circuit 8 opens switch 6a so adder circuit 7 is responsive only to the signal proportional to the smaller of the power and gasifier turbine deviations ($\Delta Ngg$ or $\Delta Npt$), to the exclusion of a signal related to the integral of the smaller deviation, since the output of integrator 6 is zero. In response to the output of circuit 1 being greater than the output of adder 7, as occurs during normal operation, comparator 8 derives a signal to activate switch 9 to close contacts 9b and 9c so the output of the adder is applied to valve 10. Simultaneously, the output signal of comparator 8 closes switch 6a so that integrator 6 can derive a non-zero output, to provide a proportional-integral feed back controller during normal operation.

The manner of operation of the fuel supply control system shown in FIG. 1 is explained hereinafter with reference to FIG. 2.

Figure 2:
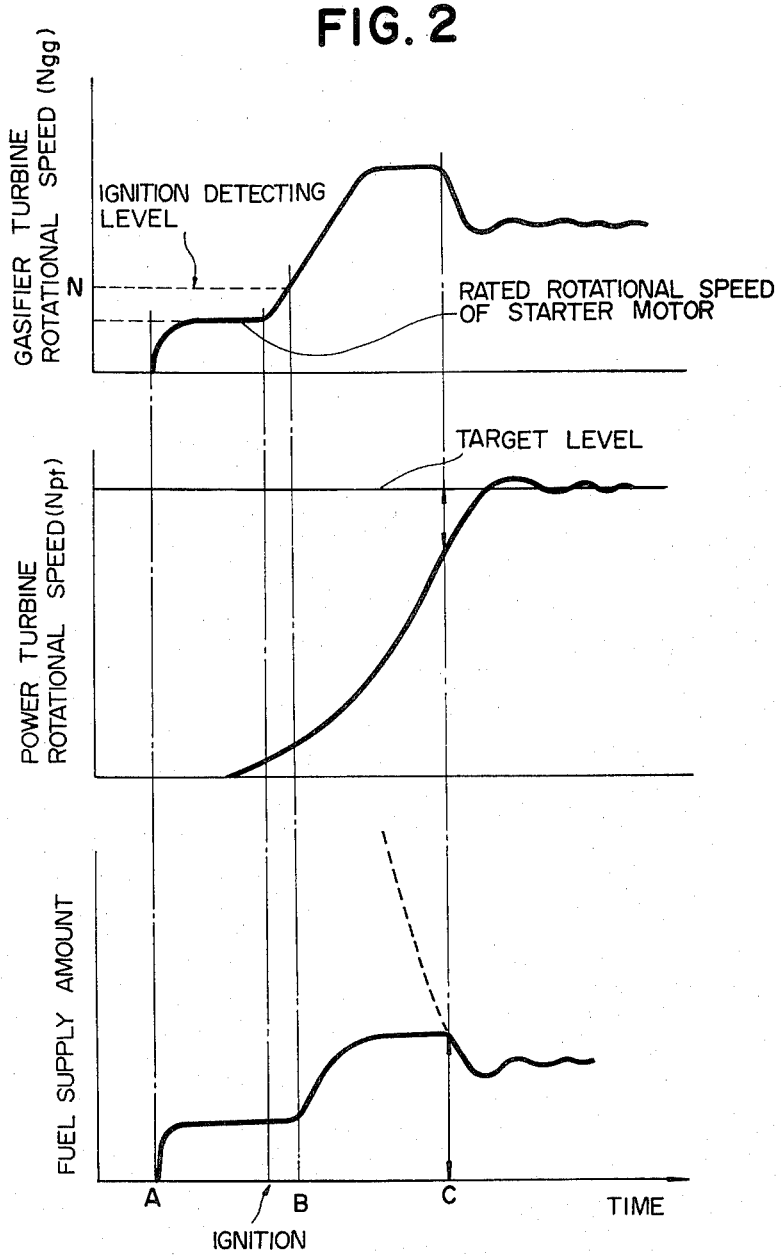
FIG. 2 is a graph of the operation mode of a dual-shaft gas turbine engine equipped with the fuel control system of FIG. 1.

To start engine, at time A, FIG. 2, a switch 1a is closed in synchronism with operating an engine starting switch (not shown). Then, a voltage signal, having a value determined by a tap on potentiometer $T_1$, is fed to the fuel supply control valve 10 through a buffer amplifier 1c and the switching circuit 9. The signal from potentimeter $T_1$ has an amplitude representative of an optimum amount of fuel for ignition, so that the optimum amount of fuel required for engine ignition is supplied to valve 10 at the time of ignition.

After ignition, at the instant when the rotational speed Ngg of a starter motor (not shown) exceeds a predetermined rotational speed N comparator 1d produces a high level signal at a judged time point for engine ignition. Speed N represents engine ignition at a time B, FIG. 2; speed N is, for example, 10000 rpm for a rated rotational starter motor speed of 8000 rpm. In response to closure of switch 1a, capacitor 1b is charged to produce the third waveform of FIG. 2. The judged ignition time may also be determined by detecting the temperature of combustion flame or combustion gas. After the judged ignition time capacitor 1b is charged through diode 1e in response to the mentioned high level output signal of comparator 1d. For this purpose, a tap of potentiometer $T_2$ is set so the tap voltage of potentiometer $T_2$ for the high level output signal of comparator 1d is at a predetermined level which is higher than the voltage at the tap of potentiometer $T_1$. Therefore, the voltage across capacitor 1b gradually increases from a level corresponding to the optimum fuel supply for engine ignition to a new level associated with the amount of fuel necessary for engine acceleration during starting, as illustrated by the third waveform of FIG. 2.

As a result, the amount of supplied fuel gradually increases from the optimum amount for engine ignition, so that the rotational speed Ngg of the gasifier turbine increases, i.e., the gasifier turbine is accelerated. The increased gasifier turbine speed is accompanied by an increase in power turbine rotational speed Npt. The amount of fuel necessary for engine acceleration may be obtained by supplying fuel in addition to the fuel supplied for engine ignition.

The acceleration characteristics of the rotational speeds Ngg and Npt are determined by the charging time constant for capacitor 1b. Accordingly, the values of capacitor 1b and the resistors supplying current to the capacitor are set to provide smooth and stable (without surging) acceleration characteristics. As a result, the rotational speed Npt of the power turbine Npt smoothly and stably rises, so that the deviation $\Delta Npt$ quickly decreases.

At the time C (in FIG. 2) when the output signal from adder 7 becomes smaller (converted into fuel supply amount) than the signal from the setting circuit 1, comparator circuit 8 activates switch 9 so movable contact 9c leaves stationary contact 9a and contacts stationary contact 9b. Accordingly, the signal from the adder 7 is fed to the fuel control valve 10 in place of the signal from the set point circuit 1, to start closed loop control of the fuel supplied to the gas turbine engine combustor.

Simultaneously, the comparator circuit 8 causes switch 6a to close to start the operation of the integrating circuit 6, to provide stable closed loop control. In this connection, if the integrating circuit 6 is operated from the engine starting time point when the deviation $\Delta Npt$ is larger, the output value of the integrating circuit 6 abnormally increases, which raises the possibility that an excessive amount of fuel is supplied by valve 10 after the closed loop control is initiated. It will be appreciated from this, that a stable closed loop control is accomplished by operating the integrating circuit 6 after the deviation $\Delta Npt$ is sufficiently reduced. Thereafter, the power turbine rotational speed Npt is stably maintained in the vicinity of the power turbine target rotational speed Nptset by closed loop control for the amount of fuel supplied by valve 10.

Figure 3:
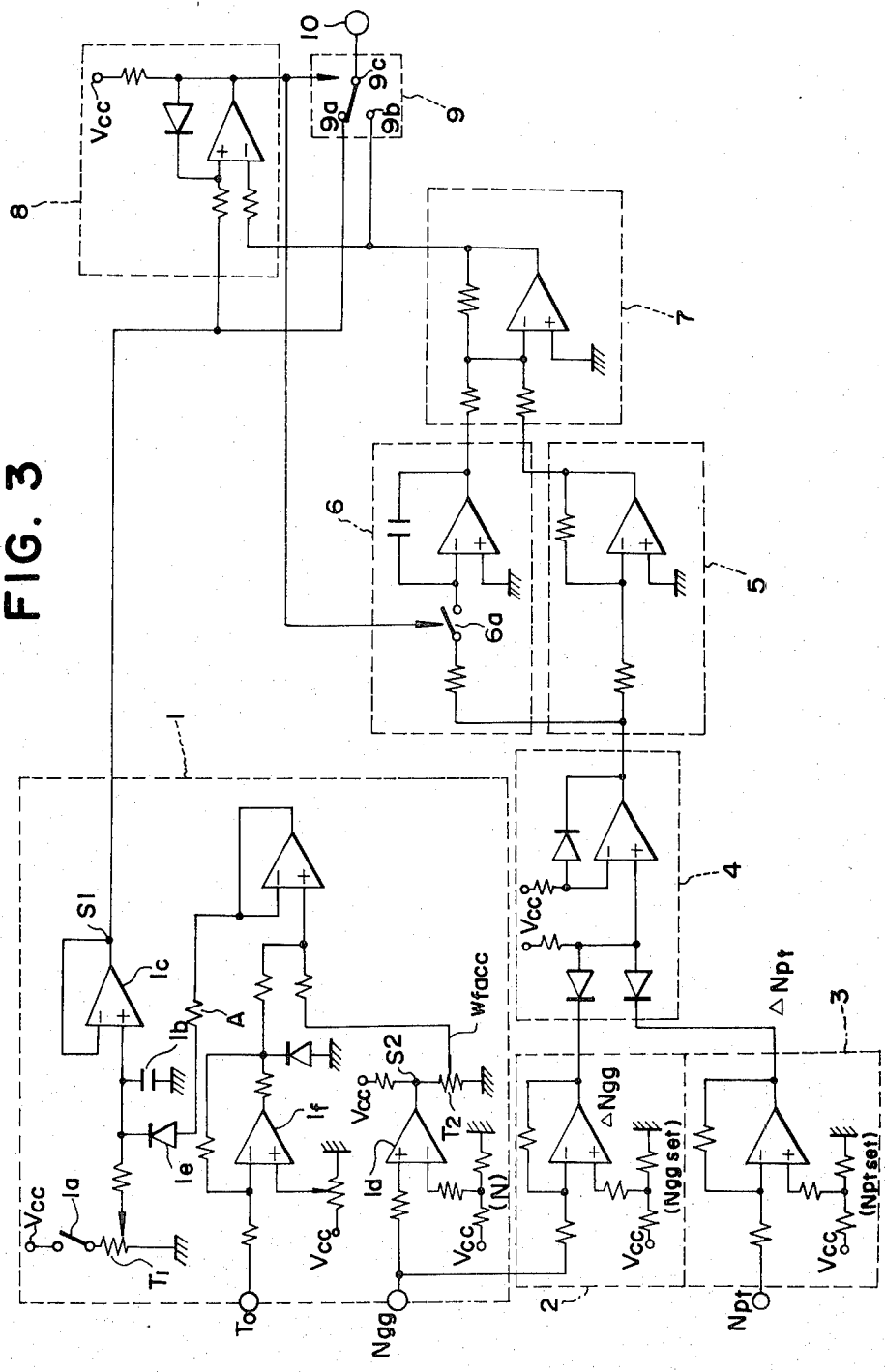
FIG. 3 is a circuit diagram of another embodiment of the fuel control system of the present invention.

FIG. 3 is an illustration of another embodiment of the fuel control system in accordance with the present invention. This embodiment is the same as that shown in FIG. 1 except for an arrangement by which the voltage supplied from the variable resistor $T_2$ to the capacitor $1b$ is compensated so it increases as a function of ambient air temperature $T_0$. In this case, when the ambient air temperature becomes lower than 8° C., the voltage supplied to the capacitor $1b$ is compensated so it increases in proporation to the reduced temperature under the action of a comparator $1f$. This increases the amount of fuel supplied by valve 10 under low temperature conditions, thereby preventing deterioration of low temperature acceleration characteristics.

As appreciated from the above, according to the present invention, the amount of fuel supplied is gradually increased after engine ignition, so that smooth and stable acceleration characteristics can be obtained, thereby shortening the engine starting time period.

What is claimed is:

1. Apparatus for controlling the speed of a turbine having a power shaft mounted independently of a gasifier shaft, the gasifier shaft being driven in response to fuel flowing through a fuel controller, comprising first means for controlling the amount of fuel flowing through the fuel controller during starting of the turbine, second means for controlling the amount of fuel flowing through the fuel controller during normal operation of the turbine, and means for switching operation from the first controlling means to the second controlling means in response to a predetermined relationship between the fuel flowing through the fuel controller during starting and the smaller of first and second errors between set point and actual values of the speeds of the power and gasifier shafts.

2. The apparatus of claim 1 wherein the second means for controlling includes means for controlling the amount of fuel flowing through the fuel controller in response to a quantity proportional to the smaller of the first and second errors and the integral of the smaller of first and second errors.

3. The apparatus of claim 1 wherein the first means includes means for initially controlling the fuel controller so a predetermined amount of fuel flows through the fuel controller unit the gasifier shaft reaches a predetermined speed and for thereafter increasing the amount of fuel flowing through the fuel controller until the second means is switched to control the fuel flowing through the fuel controller.

4. The apparatus of claim 1 wherein the first means includes means for initially controlling the fuel controller so a predetermined amount of fuel flows through the fuel controller until the gasifier shaft reaches a predetermined speed and for immediately thereafter gradually increasing the amount of fuel flowing through the fuel controller until the second means is switched to control the fuel flowing through the fuel controller.

5. Apparatus for controlling the speed of a turbine having a power shaft mounted independently of a gasifier shaft, the gasifier shaft being driven in response to fuel flowing through a fuel controller, comprising first means for controlling the amount of fuel flowing through the fuel controller during starting of the turbine, second means for controlling the amount of fuel flowing through the fuel controller during operation of the turbine, and means for switching operation from the first controlling means to the second controlling means, wherein the first means includes means for intially controlling the fuel controller so a predetermined amount of fuel flows through the fuel controller until the gasifier shaft reaches a predetermined speed and for immediately thereafter gradually increasing the amount of fuel flowing through the fuel controller until the second means is switched to control the fuel flowing through the fuel controller.

6. The apparatus of claim 3, 4, or 5 further including means for monitoring ambient air temperature, said first controlling means including means responsive to the monitoring means signalling that the ambient air temperature is less than a predetermined value for increasing the amount of fuel flowing through the fuel controller as an inverse function of monitored air temperature.

7. Apparatus for controlling the speed of a turbine having a power shaft mounted independently of a gasifier shaft, the gasifier shaft being driven in response to fuel flowing through a fuel controller, comprising means responsive to the gasifier shaft speed for deriving a first signal indicative of the gasifier shaft speed, means responsive to the power shaft speed for deriving a second signal indicative of power shaft speed, means responsive to the first and second signals and set point values for the gasifier shaft speed and the power shaft speed for deriving a third signal having a value indicative of the smaller of the errors between the indicated shaft speeds and the set point values therefor, means responsive to the third signal for deriving a fourth signal having a value proportional to the integral of the third signal, means responsive to the first signal and a predetermined starting value for the gasifier shaft speed for deriving a start signal that increases in value after the gasifier shaft speed reaches the predetermined starting value, means responsive to the start, third and fourth signals for activating the fuel controller so the fuel controller is responsive to the start signal until the start and third signals have a predetermined amplitude relationship and for thereafter activating the fuel controller so the fuel controller is responsive to the amplitude of the third and fourth signals to the exclusion of the start signal, the amount of fuel flowing through the fuel controller being determined by the amplitudes of the signals to which the fuel controller is responsive.

8. The apparatus of claim 7 further including means for monitoring ambient air temperature, and means responsive to the monitoring means signalling that the ambient air temperature is less than a predetermined value for increasing the value of the start signal as an inverse function of monitored air temperature.

9. The apparatus of claim 7 or 8 wherein the start signal deriving means includes means for deriving the start signal so it gradually increases in value immediately after the gasifier shaft speed reaches the predetermined value.

10. Apparatus for controlling the speed of a turbine having a power shaft mounted independently of a gasifier shaft, the gasifier shaft being driven in response to fuel flowing through a fuel controller, comprising first means for controlling the amount of fuel flowing through the fuel controller during starting of the turbine, second means for controlling the amount of fuel flowing through the fuel controller during normal operation of the turbine, and means for switching operation from the first controlling means to the second controlling means in response to a predetermined relationship between the speed of the gasifier shaft during starting and an error between a set point and actual value for one of the shaft speeds.

11. A method of operating a turbine having a power shaft mounted independently of a gasifier shaft, the gasifier shaft being driven in response to fuel flowing through a fuel controller, comprising activating the fuel controller so a constant optimum amount of fuel flows through the controller at the time of ignition of gases driving the gasifier and until the gasifier shaft speed reaches a predetermined value, determining the magnitude of the smaller of: an error between the gasifier shaft speed and a set point therefor and an error between the power shaft speed and a set point therefor, then gradually increasing the amount of fuel flowing through the controller until the gasifier shaft speed has a predetermined relationship with the magnitude of the smaller error, in response to the predetermined relationship being reached controlling the amount of fuel flowing through the controller as a function of the magnitude of the smaller error.

12. The method of claim 11 wherein the function is proportional to the error magnitude and the integral of the error magnitude.

13. A method of operating a turbine having a power shaft mounted independently of a gasifier shaft, the gasifier shaft being driven in response to fuel flowing through a fuel controller, comprising activating the fuel controller so a constant optimum amount of fuel flows through the controller at the time of ignition of gases driving the gasifier and until the gasifier shaft speed reaches a predetermined value, determining the magnitude of the smaller of: an error between one of the gasifier shaft speed and a set point therefor and an error between the power shaft speed and a set point therefor, in response to the predetermined relationship being reached controlling the amount of fuel flowing through the controller as a function of the magnitude of one of the errors.

14. The method of claim 11 or 13 further comprising increasing the amount of fuel flowing through the controller as the fuel is being gradually increased as an inverse function of ambient air temperature in response to the temperature being less than a predetermined value.

* * * * *